United States Patent [19]

Harrison

[11] 4,190,084

[45] Feb. 26, 1980

[54] FLOW CONTROL MEANS

[75] Inventor: Henry Harrison, Locust Valley, N.Y.

[73] Assignee: Halm Instrument Co., Inc., Glen Head, N.Y.

[21] Appl. No.: 837,548

[22] Filed: Sep. 28, 1977

[51] Int. Cl.² .......................................... G05D 7/01
[52] U.S. Cl. ..................................... 137/883; 137/501
[58] Field of Search ............................... 137/883, 501

[56] References Cited

U.S. PATENT DOCUMENTS

| | | | |
|---|---|---|---|
| 3,746,263 | 7/1973 | Reeder | 137/883 |
| 3,804,118 | 4/1974 | Love | 137/883 |
| 3,842,859 | 10/1974 | Reinke | 137/883 X |

*Primary Examiner*—Robert G. Nilson
*Attorney, Agent, or Firm*—James P. Malone

[57] ABSTRACT

A fluid manifolding system. A main flow line is connected to a plurality of branch flow lines. Adjustable control means are connected to each branch point to control the flow in that branch line independently of the pressure drop in that branch line and independently of the hydrostatic pressure in the main flow line at that branch point. The control means consists of a fixed constriction in each branch flow line and an automatic valve in each branch flow line responsive to the pressure drop across the fixed constriction and which may be biased by a force to maintain a fixed preassigned pressure drop across the fixed constriction.

1 Claim, 3 Drawing Figures

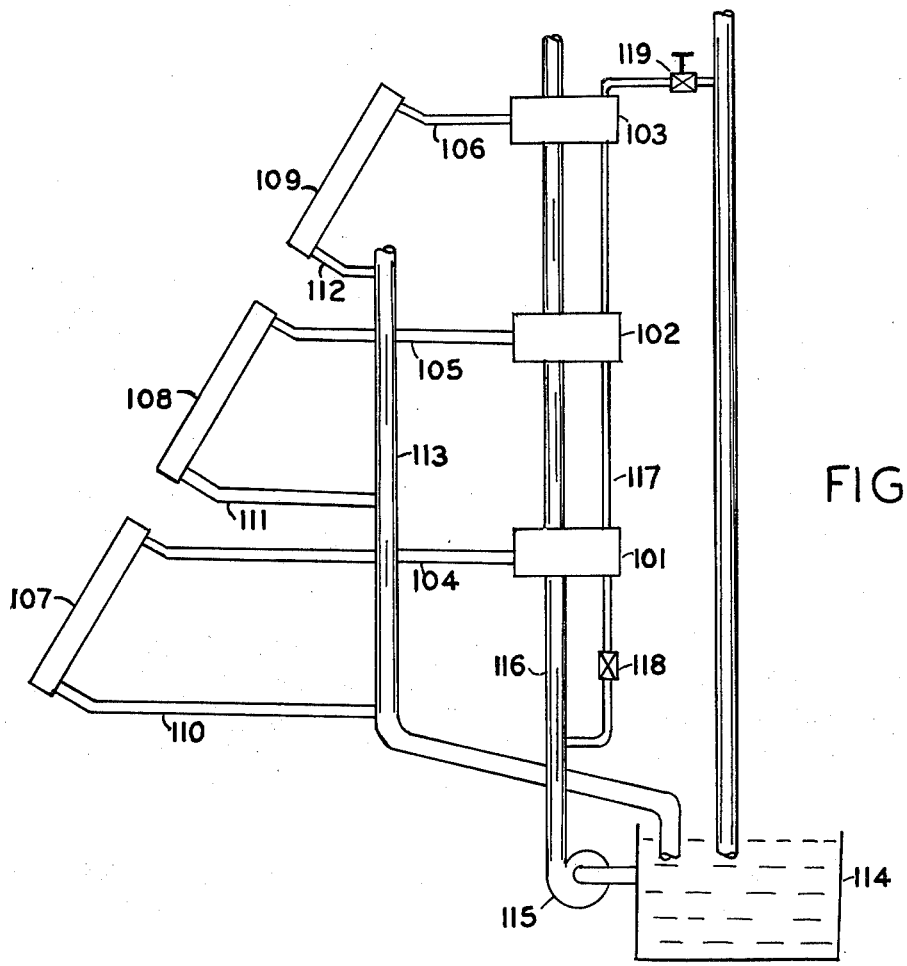
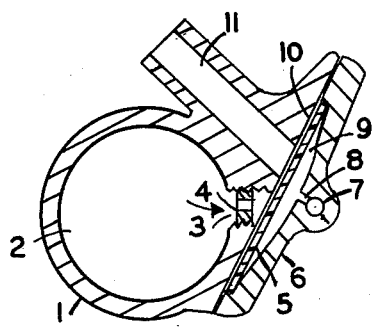
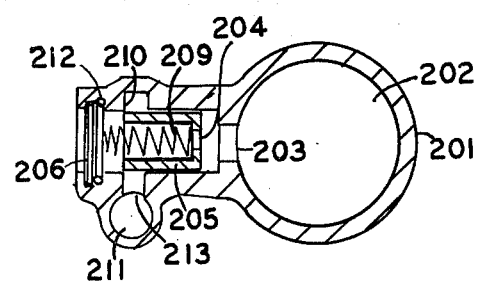

FLOW CONTROL MEANS

This invention relates to flow control means and more particularly to control of a plurality of branch lines.

In fluid flow systems it is frequently desirable to divide a main flow into two or more branch flows by means of a manifold. Often it is desired to establish equal flows in the various branches, or to proportion them according to some preassigned ratio. Furthermore, it may be required to maintain the same proportion in the branches when the total flow changes.

Up to now the common method of dividing a flow has been to provide a manifold with suitable fixed flow resistances in each of the branch lines. However, the flow in a branch depends on the hydrostatic pressures at its entrance and exit and the total flow resistance along its length, not just on the flow resistance at the manifold. Thus it is commonly necessary to make the flow resistances at the manifold branch points adjustable to compensate for the different characteristics of the branches. In this way one can balance the distribution for one total flow, but the proportion will change if the total flow changes unless the system is balanced again.

One important application of manifolding is in the collection of solar energy by liquid-cooled flat plate collectors. Where collectors are connected in parallel, it is well known that the efficiency will drop unless branch flows are proportioned to make the temperature rise in all branches the same. Changes like corrosion or scale build up, which can happen with time, unbalance the flows. Furthermore, when the total flow rate is reduced to increase the output temperature, the proportion between branch flows change. Finally, in an open trickle system, the height of each manifold branch point has a strong effect on the proportion between branch flows.

Another important application is in agricultural irrigation systems where a small proportion of the available water supply is piped to the root of each plant. For discharge at the low points, a large flow resistance is required to overcome the hydrostatic pressure. Air bubbles in the system may cause large unexpected variations in the effective hydrostatic pressure.

This invention provides a controllable hydraulic valve and a fixed flow constriction at each branch point of a manifolding system. The valves are so connected that they produce a controllable pressure drop through the constriction which does not depend on the characteristics of the remainder of the branch flow path, and which is independent of the hydrostatic pressure at the branch point.

Accordingly, the primary object of the invention is to provide a means for dividing a fluid flow in fixed proportion among a plurality of branch flow paths in such a way that the proportion is unaffected by flow resistance in the branch lines, by the magnitude of the total flow, or by the hydrostatic pressure at the several branch points.

A secondary object is to provide a means for making such a division which can be manually set to a desired proportion, but is self-adjusting to compensate for other changes in the system.

Still another object is to provide such a means which is simple, durable, inexpensive and convenient to assemble.

The way we achieve these objects is illustrated in the following description, taken with the drawings.

FIG. 1 is a section view of a controllable hydraulic valve according to this invention.

FIG. 2 is a schematic drawing of a water flow distribution system in which a plurality of these controllable valves is used to maintain the proportion of several branch flows.

FIG. 3 is another style of controllable hydraulic valve.

The device of FIG. 1 provides a single controllable branch point of a manifolding system. In the top casting 1, there is a through passage 2, which forms a portion of the main flow path. The passage 3, branching from passage 2, is constricted by an orifice 4, and closed at its end by a movable valve diaphragm 5.

The diaphragm 5 is sandwiched between the top casting 1 and a bottom casting 6. A through passage 7, in casting 6, forms a part of the control line. It connects via a small passage 8, with a cavity 9, behind the valve diaphragm 5.

The valve diaphragm 5 can rest against a flat face 10, of the top casting 1. There are two holes in this flat face of casting 1. One is the passage 3, and the other is passage 11, which connects to the branch flow line.

In operation, flow from passage 2, through passage 3, and out through passage 11, is prevented by diaphragm 5, whenever the pressure in cavity 9 is greater than the pressure in passage 3. On the other hand, flow can take place whenever the pressure in passage 3 is slightly greater than the pressure in cavity 9. Thus, pressure in the outlet of passage 3 is controlled by the pressure in the control line passage 7, which connects to cavity 9.

As long as the pressure in passage 11 is less than the pressure in passage 3, it has little effect on the flow through passage 3 past the diaphragm. Thus the flow delivered to the branch line does not depend on the flow resistance or the hydrostatic pressure of the branch line. However, forward flow can only take place if the pressure at passage 11 is less than the pressure at passage 3.

When the pressure in cavity 9 is less than the pressure in the main flow passage 2, an equal pressure drop occurs across the orifice constriction in passage 3. Thus the amount of flow delivered, a function of this pressure drop, can be set by choosing the size of the orifice insert 4. Once the orifice is chosen, flow into the branch vanes is only in response to the difference between main flow pressure and control pressure at the branch point.

FIG. 2 shows how three of these valve devices can be connected to control branch flows to three solar collectors installed at different heights above the ground. The three valves are represented by the three phantom rectangles 101, 102 and 103. The corresponding three branch lines are 104, 105 and 106, feeding water to collectors 107, 108 and 109. Return lines 110, 111 and 112 drain the collectors into a vented common drain 113.

Water from storage tank 114 is supplied to the valves by a pump 115, through a main flow line 116, which is plugged just above valve 103. Control pressure is provided at the valves 101, 102 and 103, by a small line 117. This line branches from the main flow line 116. It has fixed constriction 118 near the bottom and a throttle valve 119 near the top. The small flow of water from valve 119 returns to the tank through a vented drain line.

In operation, the pump 115 produces a pressure $P_o$ in the bottom of the pipe 116, so that the pressure at any height h above the bottom is $P_o - h\,p\,g$, p being the density of water and g, the gravitational constant. The pressure in the control line 117 is less, when water is flowing in it at a rate q, by an amount Rq, where R is the effective resistance of the orifice 118. Thus, the difference in pressure between the main flow line and the control line is the same at each of the valves 101, 102 and 103, even though they are at different heights above ground, and depends only on the rate water is flowing through the control line. Adjustment of the single small throttle valve 119 controls all the branch flows to the collectors while maintaining the proportion between them. These branch flows to collectors 107, 108 and 109, depend solely on the setting of the throttle valve 119 even though the input lines 104, 105 and 106 have different flow resistances and the output lines 110, 111, and 112, discharge at different heights above ground.

In the preceding discussion, flow resistance in the lines 116 and 117, which may bring about a change in the proportion between the branch flows, has been neglected. This effect can be made very small by putting the valves 101, 102 and 103, close together and making the passages 116 and 117, which connect them relatively large. On the other hand, the flow resistance of the segments of the lines 116 and 117 between the valves can be proportioned to make the pressure drop between valves the same in both lines.

When pressure developed at the pump 115 changes, which may happen as a result of changing the speed of the pump, the flow rate through the constriction 118, and the pressure drop across it, will also change. To prevent this effect, feedback can be used to adjust the throttle valve 119 automatically to maintain the desired pressure drop across the constriction 118 and thus the desired pressure difference between lines 116 and 117. The equipment to do this is well known in the art of flow control and is not a necessary part of the invention.

It will be clear that the foregoing example is presented for illustration only. The number of branch lines, their height above the ground, the flow resistance of the individual lines, and the desired fixed proportion between branch flows may all be very different in useful applications of this invention.

FIG. 3 shows a spool type manifolding valve in which the branch flow is held constant by a spring. The casting 201 has a through passage 202 for the main flow, and a branch flow passage 203 leading into a bored cylinder. A spool 205 is sized to slide in the cylinder. There is a constricted passage in the end of the spool. The spool is urged toward the front of the cylinder by a compression spring 209.

Near the back of the cylinder is a groove 213 which communicates with the branch outlet passage 211. The back end of cylinder is closed with a plug 206, which also functions as a seat for the compression spring. This plug is held in place by staking and sealed against leakage by an O-ring 212.

In operation, water flows from mainflow passage 202 through passage 203, through the orifice constriction 204, through the groove 213, and out through the passage 211 to the branch flow path. Whenever the flow increases beyond the controlled value, the pressure drop across the constriction 204 in the spool begins to compress the spring 209. This reduces the crack between the edge of the spool 205 and the edge 210 of the groove 213, which strongly resists the increase. Similarly, if the flow starts to decrease below the controlled value, the spool moves forward opening the crack to the groove 213 so that flow resistance decreases, counteracting the tendency for flow to decrease. Thus, the flow rate is maintained at the level where the spring pressure just balances the pressure drop across the orifice 204.

It is claimed:

1. A fluid manifolding system comprising a main flow line, a plurality of branch flow lines, a flow control valve means connected to each branch point, and a control line operably connected to said control valve means, wherein said control valve means comprises in sequence a fixed constriction in the branch flow path and a flexible diaphragm responsive to the pressure in said control line, positioned for throttling the flow in said branch flow path, and means for controlling the control line pressure in relation to the main flow line pressure, whereby the flow in each of said branch flow lines is maintained at a desired flow rate.

* * * * *